United States Patent
Sorenson, III

(10) Patent No.: US 9,942,084 B1
(45) Date of Patent: Apr. 10, 2018

(54) MANAGING DATA STORED IN DISTRIBUTED BUFFER CACHES

(75) Inventor: James C. Sorenson, III, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 1478 days.

(21) Appl. No.: 13/465,962

(22) Filed: May 7, 2012

(51) Int. Cl.
  *G06F 13/00* (2006.01)
  *H04L 29/08* (2006.01)

(52) U.S. Cl.
  CPC .......................... *H04L 29/08549* (2013.01)

(58) Field of Classification Search
  CPC ......... H04L 29/08549; H04L 29/08072; H04L 29/06; G06F 15/167; G06F 3/067
  USPC .......................................... 709/214; 711/119
  See application file for complete search history.

(56) References Cited

U.S. PATENT DOCUMENTS

| | | | |
|---|---|---|---|
| 7,725,655 B2 | 5/2010 | Frolund et al. | |
| 7,810,647 B2* | 10/2010 | Ganesan et al. | 209/203 |
| 2009/0240869 A1* | 9/2009 | O'Krafka et al. | 711/103 |

OTHER PUBLICATIONS

Fujimura, A., et al., "Network Coding vs. Erasure Coding: Reliable Multicast in Ad Hoc Networks," Proceedings of the Second Annual Conference of the International Technology Alliance, London UK, Sep. 2008, 2 pages.

Widmer, J., et al., "Network Coding for Efficient Communication in Extreme Networks," 2 SIGCOMM '05 Workshop, Aug. 22-26, 2005, Philadelphia, PA, U.S.A, 2005, 8 pages.

"Erasure Code," retrieved on May 2, 2012, from http://en.wikipedia.org/wiki/Erasure_coding, 5 pages.

"RAID," retrieved on May 2, 2012, from http://en.wikipedia.org/wiki/RAID, 25 pages.

* cited by examiner

*Primary Examiner* — Robert B Harrell

(74) *Attorney, Agent, or Firm* — Seed IP Law Group LLP

(57) ABSTRACT

Techniques are described for automatically managing the use of a buffer cache in volatile memory, including in at least some situations to distribute the buffer cache across the volatile memory of a pool of multiple computing devices. Furthermore, the data that is stored in such a distributed buffer cache may in some situations be stored in a redundant manner, such that the stored data may be recovered from a subset of the computing devices in the pool, such as by using erasure coding techniques. In some situations, the described techniques are used to provide a distributed database buffer cache to support operations of a database server program for a database—thus, as database data is retrieved from a non-volatile storage device, that database data may also be redundantly stored across the distributed database buffer cache for later retrieval and use.

31 Claims, 6 Drawing Sheets

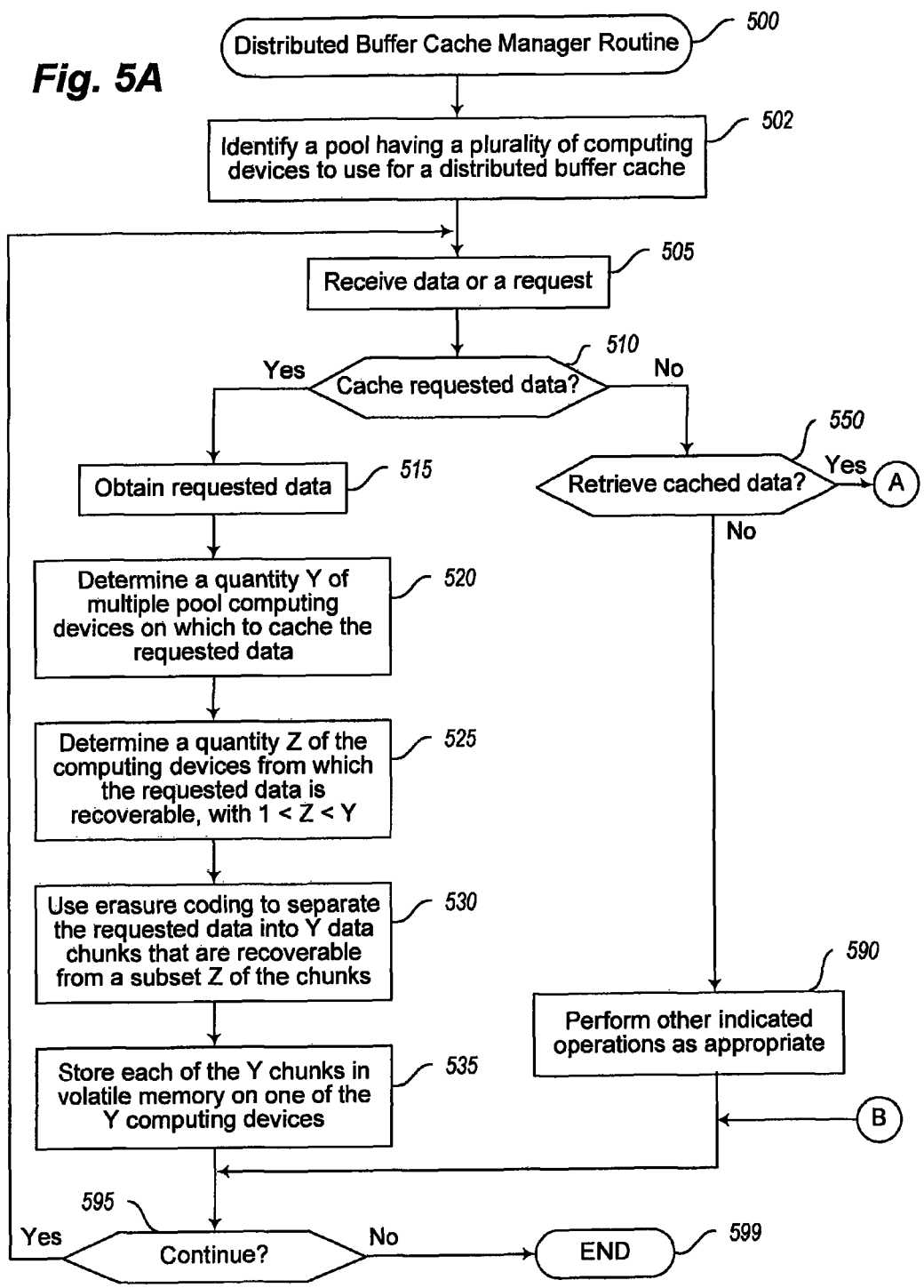

MANAGING DATA STORED IN DISTRIBUTED BUFFER CACHES

BACKGROUND

Some types of software programs create and use a memory cache during operation, such as by using RAM ("random access memory") or other volatile memory of the computing device on which the program is executing. For example, after an application program or an operating system program has initiated a retrieval of data from a hard disk or other non-volatile storage device, the retrieved data may be stored in the memory cache, to enable that cached data to later be used without having to again retrieve the data from the non-volatile storage device. One example of a type of program that may use particularly large memory caches is a database server program that supports retrieval of data from a database, which may use volatile memory to cache data retrieved from one or more non-volatile storage devices that store data for the database. Benefits of such memory caches include rapid access to cached data, relative to having to instead retrieve that data from non-volatile storage. However, when a computing device that has a memory cache is powered down (e.g., in response to a software error or other failure), all of the data that was present in the memory cache is lost, and upon restart it can be a time-consuming process to gradually refill the memory cache to a state similar to that before the power down operation.

BRIEF DESCRIPTION OF THE DRAWINGS

FIGS. 5A and 5B are a flow diagram of an example embodiment of a Distributed Buffer Cache Manager routine.

DETAILED DESCRIPTION

Figure 1:
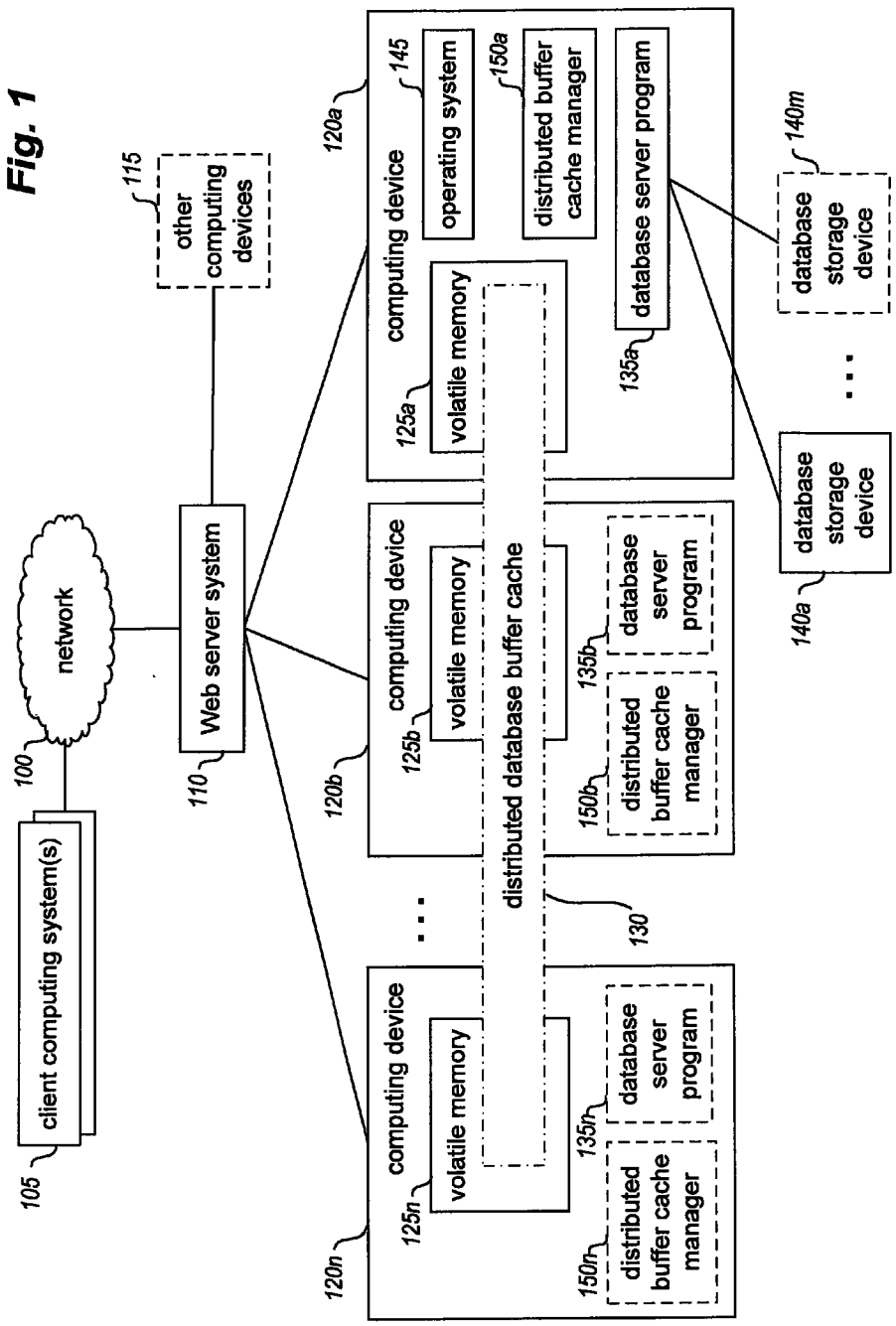
FIG. 1 is a network diagram illustrating an example environment in which a distributed buffer cache may be used.

Techniques are described for automatically managing the use of a buffer cache in volatile memory to support the operation of one or more software programs. In at least some embodiments, the buffer cache is distributed across the volatile memory of multiple computing devices. Furthermore, in at least some embodiments, the data that is cached in the distributed buffer cache is stored in a redundant manner, such that the stored data may be recovered from a subset of the computing devices in the pool. In particular, erasure coding techniques may be used to provide redundancy in the data storage in at least some embodiments, as described in greater detail below. In addition, some or all of the described techniques are provided by operations of a distributed buffer cache manager system in at least some embodiments.

The described techniques may be used in a variety of types of environments and situations, including with a variety of types of software programs. As one illustrative example, the described techniques may be used to support operations of a database, such as by providing and using a distributed database buffer cache that stores database data across the volatile memory of a pool of multiple computing devices. In such embodiments, the distributed buffer cache manager system that manages the distributed database buffer cache may be integrated with a database server program that manages the database, or may instead be provided in other manners (e.g., by integrating it into an operating system of one or more computing systems that execute the database server program; by operating it in a manner independent of integration with any particular software program, including in situations to optionally support one or more other programs in addition to the database server program; etc.). Accordingly, as database data is retrieved from one or more non-volatile storage devices that support the database, some or all of that database data may also be stored in the distributed database buffer cache for later use, in a redundant manner that enables later retrieval of the cached data from a subset of the computing devices of the pool.

The use of the described techniques provides a variety of benefits in various embodiments. For example, by distributing a buffer cache across a pool of multiple computing devices, the size of the buffer cache may be expanded beyond what would be possible on a single computing device, such as beyond the size of the volatile memory provided by a single computing device. Furthermore, the size of the buffer cache may be dynamically modified while the buffer cache is in use, such as by modifying the computing devices that are part of the pool (e.g., to expand the size of the buffer cache by adding additional computing devices to the pool). In addition, the use of redundancy in the cached data across the distributed buffer cache enables operation of the distributed buffer cache to continue even if one or more of the computing devices of the pool fail or are otherwise unavailable. Thus, if cached data is requested, a subset of the pool computing devices that remain available may be used to provide that requested data. Furthermore, the use of redundancy in the cached data across the distributed buffer cache also enables an unavailable computing device in the pool to be replaced with a new computing device, including in some embodiments and situations to preload the volatile memory of the new computing device with a portion of the cached data at a time before or just after it is added to the pool. For example, some or all of the cached data in the distributed buffer cache may be retrieved from the other remaining available computing devices of the pool and the retrieved cached data may be used to determine part of the cached data to be stored in the volatile memory of the new computing device (e.g., to store the same or similar data on the new computing device as was previously stored on the pool computing device that was replaced).

Various types of devices and components may be used to perform the described techniques in various embodiments. As previously noted, in at least some embodiments, the distributed buffer cache uses volatile memory of multiple computing devices in a pool, with the volatile memory losing data if the memory is not powered (e.g., if the computing device that contains the memory is restarted or otherwise shut down). The volatile memory on a pool computing device that is used may include, for example, one or more types of RAM ("random access memory"), such as DRAM ("dynamic RAM") and/or SRAM ("static RAM"). In addition, the non-volatile storage from which data may be retrieved may include, for example, one or more of the following: a hard disk drive; non-volatile flash memory (e.g., NAND type flash memory or NOR type flash memory), including in one or more memory cards, USB flash drives or keys, solid-state drives, etc.; magnetic tape drive; optical disk drive; non-flash EEPROM ("electrically erasable programmable read-only memory"); FRAM ("ferroelectric RAM"); MRAM ("magnetoresistive RAM"); PRAM ("phase-change RAM"); etc.

For illustrative purposes, some embodiments are described below in which specific types of operations are performed and specific types of devices and data are used. These examples are provided for illustrative purposes and are simplified for the sake of brevity. In addition, the inventive techniques may be used in a wide variety of other situations, some of which are discussed below.

FIG. 1 is a network diagram illustrating an example of various devices and systems that operate to retrieve and provide requested data, based in part on use of a distributed buffer cache to facilitate efficient data retrieval. In particular, in the illustrated example, a pool of N computing devices 120a-120n (wherein the pool is referred to as computing devices 120 for explanation purposes) is used to provide a distributed buffer cache 130, by using volatile memory 125 (e.g., RAM) of those computing devices 120. An embodiment of a manager system 150 (wherein distributed buffer cache managers 150a-n are referred to as distributed buffer cache manager 150 for explanation purposes) for the distributed buffer cache 130 executes to manage operation of the distributed buffer cache 130, as described in greater detail below.

In the illustrated embodiment, the devices and systems support a database (not shown) that stores various data (not shown) on one or more non-volatile database storage devices 140a through 140m and a database server program 135 executes to manage operation of the database. In the illustrated embodiment, the database server program 135 operates on one or more of the computing devices 120 of the pool. While in some embodiments the various database server programs on the various pool computing devices may operate together in a distributed manner, in the illustrated embodiment a copy 135a of the database server program executing on computing device 120a of the pool has been elected or configured to operate as a primary copy of the database server program at the current time, with other copies 135b-135n of the database server program on other pool computing devices available to take over the primary role if appropriate (e.g., if pool computing device 120a fails or otherwise becomes unavailable). In other embodiments, the database server program 135 may be executed by one or more other programmed computing systems (not shown) that are distinct from the computing devices 120.

In the illustrated embodiment, the computing device 120a includes volatile memory 125a that is used to provide a portion of the distributed database buffer cache 130 and is also used to execute the database server program copy 135a, an operating system 145, and a copy 150a of the distributed buffer cache manager system. In another embodiment, the computing device 120a could include volatile memory for use with the distributed database buffer cache 130 that is separate from other volatile memory used by any executing programs. In a similar manner to the database server program 135, the buffer cache manager system 150 can operate on one or more of the computing devices 120 of the pool, such as by having at least a portion of the buffer cache manager system program 150 execute on the computing devices 120 in the pool. While in some embodiments the various buffer cache manager system programs on the various pool computing devices may operate together in a distributed manner, in the illustrated embodiment the copy 150a of the manager system program executing on computing device 120a of the pool has been elected or configured to operate as a primary copy of the manager system program at the current time, such as in conjunction with the primary database server program copy 135a, with other copies 150b-150n of the manager system program on other pool computing devices available to take over the primary role if appropriate (e.g., if pool computing device 120a fails or otherwise becomes unavailable).

Figure 3:
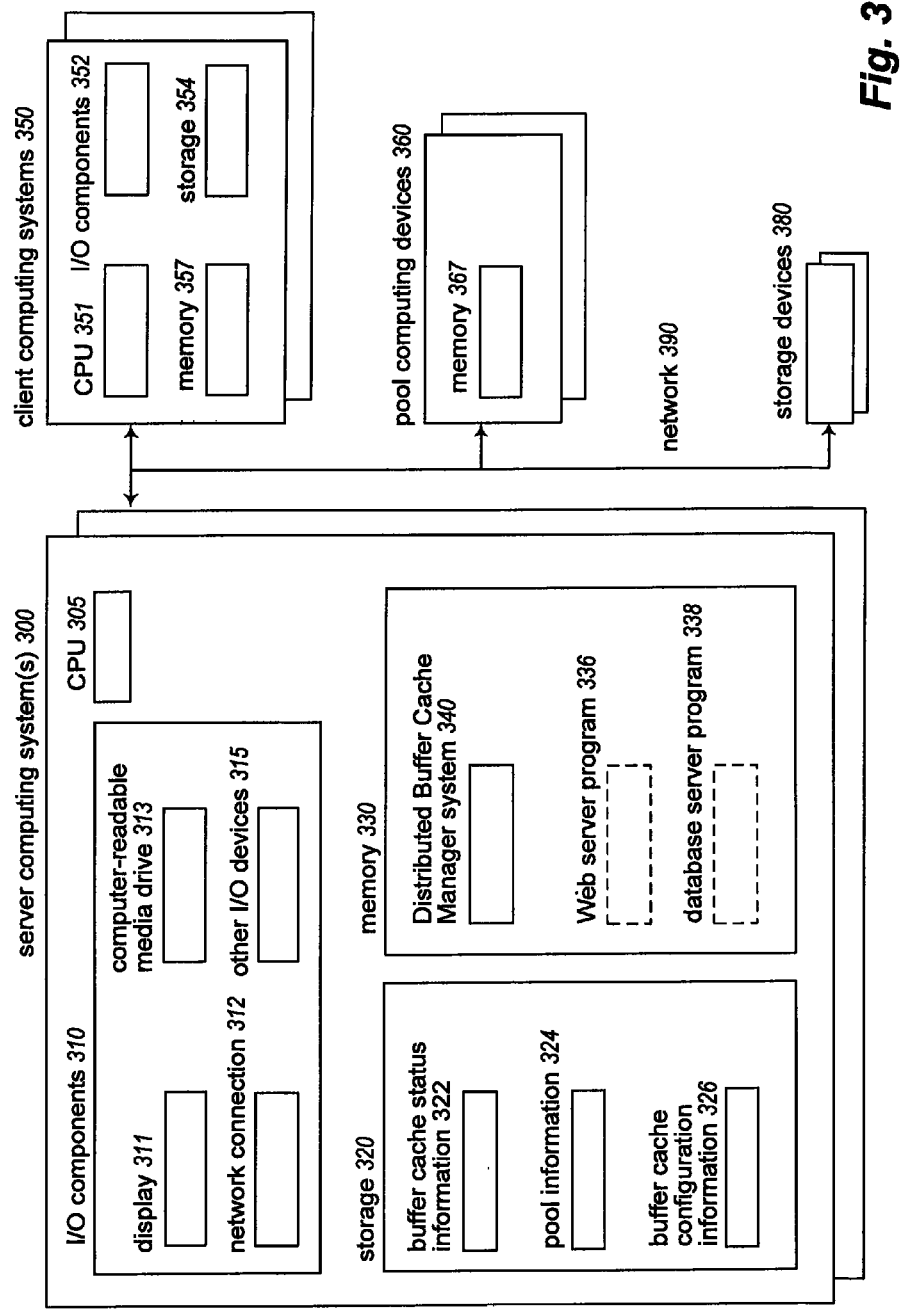
FIG. 3 is a block diagram illustrating an example computing system suitable for executing an embodiment of a system that manages use of a distributed buffer cache.

It will be appreciated that computing device 120a may also include additional components that are not illustrated, as discussed in greater detail with respect to FIG. 3, including one or more hardware processors that participate in execution of the operating system 145 and database server program copy 135a and distributed buffer cache manager system copy 150a (e.g., by executing software instructions of the programs 135a and 145 and system 150a that configure the computing device 120a to perform corresponding operations). In a similar manner, computing devices 120b-120n may each include various components other than volatile memory and may each execute one or more other programs (e.g., an operating system program), although such other components and other programs are not illustrated in this example.

As previously noted, at least some of the described techniques are performed by automated operations of the distributed buffer cache manager system 150. In the illustrated example, the distributed buffer cache manager system copy 150a is shown executing separately on computing device 120a from the database server program copy 135a. This configuration enables the manager system 150 to operate as a stand-alone system and to interact with one or more other programs (e.g., the database server program 135) to support their operations, such as by receiving data to be cached from the other program(s) and by providing cached data upon request from the other program(s). In other embodiments, the distributed buffer cache manager system 150 may execute remotely (e.g., over one or more networks) from the program(s) that is supports or instead be integrated into a particular program with which it is used (e.g., with the database server program 135; with the operating system 145; with a different type of application program, not shown; etc.). In addition, in some embodiments, a single distributed buffer cache manager system 150 may operate multiple distributed buffer caches or one or more pools of computing devices, such as to support operations of multiple other programs (e.g., with one distributed buffer cache for each other program).

FIG. 1 further illustrates one or more remote client computing systems 105 that in this example interact with a Web server system 110 over one or more networks 100 (e.g., over one or more public networks, such as the Internet; over a private network, such as a corporate or university network, that is wholly or partially inaccessible to non-privileged users, with systems 105 and 110 being part of that private network; etc.). In this illustrated example embodiment, the Web server system 110 supports one or more Web sites (not shown) that use data from the database for at least some of the Web pages of the site(s), and thus the Web server system 110 interacts with the database server program 135 to request data from the database as needed. In addition, in at least some embodiments and situations, the Web server system 110 may further interact with one or more other optional computing devices 115 to perform other operations related to providing the Web site(s) that do not include retrieval of database data.

Thus, if a particular one of the client computing systems 105 makes a request over the network 100 to the Web server system 110 for one or more Web pages, the Web server system 110 may initiate a request to the database server program 135 to retrieve and provide indicated database data. As previously noted, the distributed buffer cache manager system 150 uses the database buffer cache 130 to cache or otherwise temporarily store database data that has been retrieved from one or more of the non-volatile storage devices 140 to enable faster subsequent retrieval of the data from the cache if the cache includes the desired data. Accordingly, when the database server program 135 receives a request from the Web server system 110 for indicated data, the database server program 135 first checks the distributed database buffer cache 130 (e.g., by making a corresponding request to the distributed buffer cache manager system 150) to determine if the requested data is available in the cache, and if so obtains the requested data from the distributed database buffer cache 130 (e.g., as a response to the prior request to the distributed buffer cache manager system 150) and provides the requested data to the Web server system 110. Alternatively, if the requested data is not available in the distributed database buffer cache 130, the database server program 135 instead retrieves the requested data from one or more of the non-volatile database storage devices 140 that store the data, and provides the requested data to the Web server system 110.

In addition, upon retrieval of data from the non-volatile database storage device(s) 140, the database server program 135 and/or the distributed buffer cache manager system 150 determine whether to cache that retrieved data, and if so determined, the distributed buffer cache manager system 150 stores that retrieved data in the distributed database buffer cache 130 for later use in supporting additional requests for that data. For example, the database server program 135 may provide all data retrieved from the non-volatile database storage devices 140 to the distributed buffer cache manager system 150 and the distributed buffer cache manager system 150 may determine which data to cache and for how long, such as based on one or more specified cache maintenance policies for the distributed database buffer cache 130 and/or based on a current condition of the distributed database buffer cache 130 (e.g., an amount of free space, if any). In this manner, the distributed database buffer cache 130 enables faster retrieval of data that has been previously supplied.

In some embodiments, some or all of the cached data in the distributed database buffer cache 130 is stored in a redundant manner, such that the cached data may be recovered from a subset of the computing devices in the pool. Such redundancy may be performed in various manners in various embodiments. In particular, as previously noted, the redundancy of the data across the multiple computing devices of the pool is performed in at least some embodiments based at least in part on using erasure coding techniques, although in other embodiments the redundancy may be provided in other manners (e.g., by fully replicating some or all pieces of data on some or all of the pool computing devices, by using another type of forward error correction code scheme, etc.).

Thus, the distributed buffer cache manager system 150 may in some embodiments use a configurable erasure code to separate a given group of data into an automatically determined quantity of multiple encoded data chunks. For example, each chunk can be based on the group of data but does not include all of the group of data and with the quantity of data chunks can be dynamically determined at a time of the encoding (e.g., based at least in part on information about a quantity of pool computing devices that are currently available to use, such as to determine the quantity of multiple data chunks to match the quantity of available pool computing devices). Alternatively, the distributed buffer cache manager system 150 may in some embodiments use a constant predetermined quantity of data chunks into which to separate some or all groups of data that are to be cached, such as a quantity that corresponds to a defined quantity of computing devices that are maintained in the pool, or instead to reflect some quantity that is a subset of the quantity of pool computing devices. Furthermore, the distributed buffer cache manager system 150 may in some embodiments use various other techniques to determine a first quantity of pool computing devices on which to store encoded data chunks for one or more data groups and/or a smaller second quantity of pool computing devices from which a particular data group is recoverable. As one example, the distributed buffer cache manager system 150 may in some embodiments determine such a first quantity and/or a second quantity based on one or more determined performance characteristics of interest, such as to reflect a particular software program that will use a particular distributed buffer cache (e.g., to select a particular first and second quantity to use to encode some or all data in that distributed buffer cache on behalf of that software program). A non-exclusive list of determined performance characteristics that may be used include, for example, the following: to minimize or otherwise reduce latency, such as with respect to storing encoded data chunks on computing devices of the pool and/or with respect to retrieving encoded data chunks from pool computing devices (e.g., by maximizing or otherwise increasing the code rate and/or the recovery efficiency, as described in greater detail below); to maximize or otherwise increase reliability, such as with respect to retrieving encoded data chunks from pool computing devices, including in situations in which one or more computing devices that store encoded data chunks for a group of data being retrieved have failed or are otherwise unavailable (e.g., by minimizing or otherwise reducing the code rate and/or the recovery efficiency); to minimize or otherwise reduce a total amount of memory used on the computing devices of the pool, such as with respect to storing encoded data chunks on computing devices of the pool (e.g., by maximizing or otherwise increasing the code rate and/or the recovery efficiency); etc. It will be appreciated that such first and second quantities may be selected at various times and in various manners in various embodiments.

After separating the group of data into multiple data chunks, the multiple data chunks are stored on some or all of the pool computing devices 120, such as by storing each data chunk on a distinct computing device within the pool computing devices (e.g., one data chunk for each pool computing device). In addition, when using erasure coding techniques, the distributed buffer cache manager system 150 may determine a particular lower quantity (less than the determined quantity of data chunks) of chunks that can be used to recover the cached data, such that any subset of the multiple data chunks of the lower quantity may be used. Thus, as an example, each cached data group may be stored across all pool computing devices 120 (e.g., of quantity N), but may be recoverable from any subset of the pool computing devices that includes the specified lower quantity (e.g., of quantity N−2, or N−4, etc.). In other embodiments, other arrangements may be used.

An erasure code generally may be used to transform information having X pieces (e.g., X bytes) into a larger number of Y pieces (e.g., Y bytes), with the original X pieces of information being recoverable from a specified subset Z of the Y pieces—in such situations, the ratio of X/Y may be referred to as the "code rate," and the ratio of Z/X may be referred to as the "reception efficiency" or "recovery efficiency"—the quantity Y is referred to at times herein as "the first quantity", and the quantity Z is referred to at times herein as "the second quantity." Thus, for example, an erasure code may be used to encode a group of data into multiple encoded data chunks that may each be stored separately, with the original group of data being recoverable from a subset of the multiple data chunks (e.g., with a given data group transformed into 5 data chunks, of which 4 are needed to reconstruct the original data group; into 6 data chunks, of which 3 are needed for reconstruction; into 5 data chunks, of which 2 are needed for reconstruction; etc.). Furthermore, at least some erasure codes are configurable, so as to enable selected code rates and/or selected recovery efficiencies to dynamically be selected and used for a particular encoding/decoding. In other embodiments, other types of encoding and decoding schemes may be used instead of erasure codes, with non-exclusive examples including other forward error correction code schemes, various compression/decompression schemes, various encryption/decryption schemes, etc.

In addition, in some embodiments and situations, the encoding of each of the multiple data chunks for a data group may include adding additional information, such as various types of error-correcting codes. As one example, the additional information that is added may include new information that was not previously present in the data group (e.g., a parity bit or checksum). In addition, the data that is being stored in the cache may have various forms in various embodiments, such as a file, an object, a database table entry or other record, a database table, etc.

As previously noted, if a computing device within the pool computing devices becomes unavailable while in use, the distributed database buffer cache 130 may nonetheless continue to be used, based at least in part on the use of redundancy in storing the cached data. For example, if computing device 120b fails or otherwise becomes unavailable while the distributed database buffer cache 130 is in use, cached data may still be retrieved using some or all of the remaining available pool computing devices 120a and 120c-120n. In addition, if so desired, the data that was previously stored in the volatile memory 125b of the unavailable computing device 120b may be recreated by using the cached data from the other available pool computing devices 120, based on the same redundant storage techniques used in the initial storage of that cached data. By recreating that same subset of the cached data that was previously stored in volatile memory 125b, a new replacement computing device (not shown) may be added to the pool and its volatile memory can be immediately loaded based on such cached data retrieved from the volatile memory 125 of the other available pool computing devices. In this manner, the failed or unavailable pool computing device can be quickly replaced in the pool and have the volatile memory of the new computing device be rapidly set to the prior state of the unavailable pool computing device, allowing operation of the distributed database buffer cache to proceed with minimal interruption.

The various devices that are used in providing the described techniques may also be inter-related in various manners, such as to all be independent devices, or to instead in some embodiments be overlapping devices. For example, such devices can include the multiple computing devices of the pool that support a distributed buffer cache, one or more non-volatile storage devices that persistently store data, and one or more programmed computing systems that execute the distributed buffer cache manager system. For example, one or some or all of the pool computing devices may also serve as the one or more programmed computing systems that execute the distributed buffer cache manager system. In addition, one or some or all of the pool computing devices may also include one or more or all of the non-volatile storage devices, and/or one or more programmed computing systems that execute the distributed buffer cache manager system may also include one or more or all of the non-volatile storage devices. Thus, in the example of FIG. 1, while the distributed buffer cache manager system 150 is illustrated as executing on at least one of the pool computing devices, in other embodiments it may instead execute on one or more programmed computing systems separate from the pool computing devices. Similarly, one or more of the non-volatile storage devices 140 may be part of the computing device 120a (e.g., may be a hard disk or other non-volatile storage device that is contained within or otherwise attached to computing device 120a) or of other pool computing devices 120, while in other embodiments some or all of the database storage devices 140 may instead be remote from the database server program 135 and accessed by the database server program 135 over one or more networks (not shown).

Figure 2:
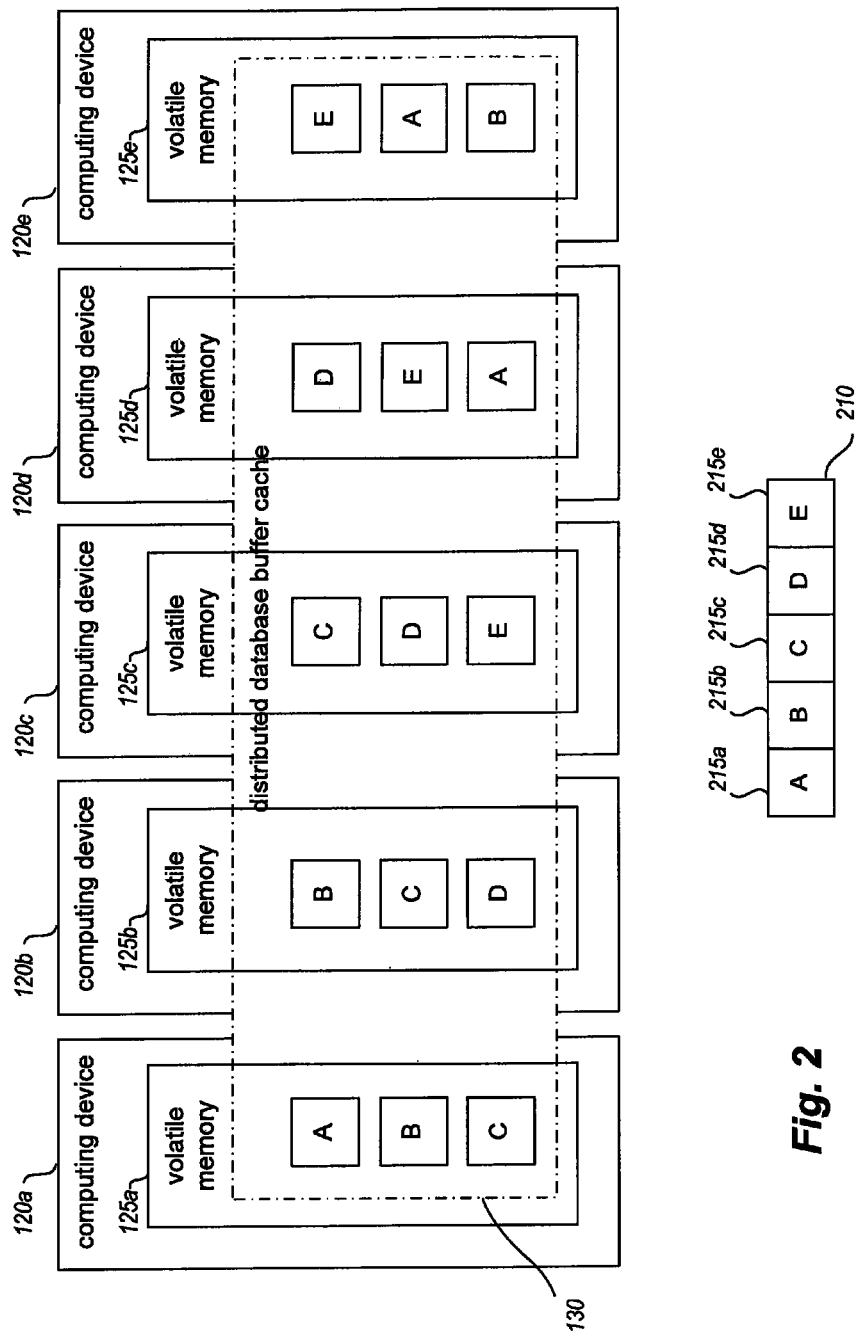
FIG. 2 illustrates an example of use of a distributed buffer cache.

FIG. 2 continues the example of FIG. 1, and in particular illustrates the distributed database buffer cache 130 of FIG. 1. In the example of FIG. 2, the distributed database buffer cache 130 is provided using a pool of five computing devices 120, with those being computing devices 120a-120e. The computing devices 120a-120e include volatile memory 125a-125e, respectively, with at least some of that volatile memory 125 being used to provide the distributed database buffer cache 130.

In the example of FIG. 2, a group of data 210 has been retrieved from one or more non-volatile storage devices (not shown) of the database, and that data group 210 has been cached in the distributed database buffer cache 130 using the pool of multiple computing devices. In particular, the data group 210 has been stored in this example in a redundant manner in the 5 computing devices of the pool, such that the data group 210 may be retrieved from any 3 of the 5 computing devices. For the sake of illustration, the redundant data stored in the distributed database buffer cache 130 of FIG. 2 is not generated using erasure codes, but instead using a more simplistic partial replication scheme described below, but it will be appreciated that erasure coding or other redundancy techniques may be used in other embodiments.

In particular, in this example of FIG. 2, the data group 210 is divided into five logical data portions 215a, 215b, 215c, 215d, and 215e. The volatile memory 125 of each of the five pool computing devices 120 contains a subset of the data group 210, and in particular contains a distinct set of three of the five logical data portions 215a-215e in this example. As noted above, the entire data group 210 may be retrieved from the distributed database buffer cache 130 using at most any three of the five pool computing devices in this example. For example, using computing devices 120a, 120b and 120e, logical portions A, B, and C may be retrieved from volatile memory 125a, logical portion D may be retrieved from volatile memory 125b, and logical portion E may be retrieved from volatile memory 125e. Alternatively, as another example, using computing devices 120a, 120c and 120d, logical portion B may be retrieved from volatile memory 125a, logical portions C and D may be retrieved from volatile memory 125c, and logical portions A and E may be retrieved from volatile memory 125d. More generally, because every logical data portion is replicated on three pool computing devices in this example, the loss or unavailability of any two pool computing devices does not prevent the recovery of the entire data group 210.

Accordingly, when a request is received to obtain data group 210 from the distributed database buffer cache 130, the distributed buffer cache manager system (not shown) may retrieve the various logical portions A, B, C, D, and E in various manners, and provide the requested data. Furthermore, if one or two of the five pool computing devices fail or otherwise becomes unavailable, the logical data portions stored in the volatile memory of the failed or unavailable computing device(s) may be replicated using the data stored in the volatile memory of the remaining available pool computing devices. Thus, as one illustrative example, if computing device 120b fails or becomes otherwise unavailable, and a new replacement computing device (not shown) is added to the pool to take its place, the data portions B, C, and D that were in volatile memory 125b can be retrieved from the volatile memories 125a and 125c-125e of the remaining available pool computing devices, and reloaded in the volatile memory of the new replacement computing device, to enable operation of the distributed database buffer cache 130 to quickly continue. Furthermore, even before the replacement computing device is added to the pool, the other available computing devices 120a and 120c-120e may continue to provide requested data, such as to provide the data group 210 upon request.

While the logical portions 215 are shown in the example of FIG. 2 as being the same size, in other embodiments, the data group 210 may be divided in other manners, including into more or less logical portions, into portions of different sizes, etc. In addition, in the illustrated example, the data group 210 is separated into 5 parts (each with three logical data portions), with one part stored on each of the pool computing devices. While all the parts are illustrated as being of equal size in this example (which in this example is 60% of the size of the data group 210), in other embodiments different pool computing devices may store different amounts of data. With the data group 210 being separated into 5 parts (that in total include fifteen of the logical data portions) and being recoverable from any 3 of the 5 parts, if erasure coding techniques had instead been used for such an encoding, the code rate would be 0.333 (5/15), and the recovery efficiency would be 1.8 (9/5), although use of actual erasure coding techniques would typically result in a higher code rate and lower recovery efficiency. In addition, if each of the 5 parts is assumed to fill the respective portions of the volatile memory 125 used to store that part, it can be seen that even the simplistic encoding scheme used in FIG. 2 allows the size of the distributed database buffer cache 130 to be 67% larger (storing a total of 5 logical portions rather than 3) than would be possible by using a non-distributed database buffer cache on a single one of the computing devices 120, with such a size expansion factor growing with a more efficient encoding scheme and/or by including additional computing devices in the pool.

It will also be appreciated that the distributed buffer cache manager system may further perform various types of cache maintenance operations in various embodiments, including in according with a specified cache policy for a particular distributed buffer cache. For example, a specified cache policy may include caching all data until the distributed buffer cache is full, and then implement a replacement strategy to determine whether to discard some cached data in order to store other data, and if so, which cached data to discard. Various types of replacement strategies may be used (e.g., least recently used, most recently used, least frequently used, random replacement, etc.), and in at least some embodiments the distributed buffer cache manager system may perform periodic or continuous operations to track the use of cached data in a manner that supports the replacement strategy (e.g., to track when cached data was last used, if the replacement strategy is least recently used or most recently used). Various other types of operations may similarly be performed, including in some embodiments and situations to enable cached data to be modified (e.g., as a temporary buffer before the modified data is written to non-volatile storage).

FIG. 3 is a block diagram illustrating one or more computing systems suitable for executing an embodiment of a distributed buffer cache manager system that manages operation of a distributed buffer cache. In particular, FIG. 3 illustrates one or more server computing systems 300 suitable for executing an embodiment of a distributed buffer cache manager system 340, which may use the volatile memory 367 on each of multiple pool computing devices 360 to provide one or more distributed buffer caches. FIG. 3 also illustrates various client computing systems 350 and storage devices 380, as discussed further below.

In the illustrated embodiment, the server computing system(s) 300 each includes one or more CPU processors 305, various I/O components 310, storage 320, and memory 330, with the I/O components including a display 311, a network connection 312, a computer-readable media drive 313, and other I/O devices 315 (e.g., a keyboard, mouse, speakers, etc.). In other embodiments, each server computing 300 may include additional hardware components and/or lack some of the illustrated hardware components.

The client computing systems 350 are each similarly illustrated as including one or more CPU processors 351, various I/O components 352, storage 354, and memory 357, although particular I/O components are not illustrated in this example, and may each further be configured in a manner to perform particular operations (e.g., by software instructions of a Web browser, not shown, that when loaded in memory 357 and executed by CPU 351 configure the client computing system 350 to perform particular automated operations). The other devices 360 and 390 may each similarly include some or all such hardware components, and may include software that when executed configures the devices to perform particular operations, but those components and/or software are not illustrated in this example for the sake of brevity.

In the illustrated embodiment, the distributed buffer cache manager system 340 executes in memory 330 of a server computing system 300, such as to include software instructions that, when executed by the CPU 305, program or otherwise configure the server computing system 300 to perform automated operations to provide some or all of the described techniques. In addition, in the illustrated embodiment, an optional Web server program 336 and/or an optional database server program 338 also execute in memory 330, such as to perform operations similar to those of Web server system 110 and database server program 135, respectively, of FIG. 1. In other embodiments, one or both of the Web server program 336 and database server program 338 may instead execute on another computing system (not shown) and interact with the distributed buffer cache manager system 340 over one or more networks 390 (e.g., in a manner analogous to network 100 of FIG. 1). Alternatively, in other embodiments, the distributed buffer cache manager system 340 may instead be integrated together as a single system with one of the Web server program 336 and database server program 338. In yet other embodiments, the distributed buffer cache manager system 340 may interact with and support one or more other types of software programs, whether instead of or in addition to the database server program 338 and/or Web server program 336.

In this illustrated embodiment, the distributed buffer cache manager system 340 provides a distributed buffer cache (not shown) using the volatile memory 367 of the multiple pool computing devices 360, such as to support the operation of one or more other programs (e.g., the database server program 338 and/or the Web server program 336). In particular, after the multiple pool computing devices 360 are made available for use with the distributed buffer cache, information 324 on storage 320 is updated to identify those pool computing devices and the portions of their volatile memory that are available for use with the distributed buffer cache. The distributed buffer cache manager system 340 may also use information 326 on storage 320 that provides configuration information, such as cache maintenance policies to use for the distributed buffer cache, information about a particular redundancy technique to use when storing the cached data in a distributed manner (e.g., a particular erasure coding techniques and corresponding parameters corresponding to the coding rate and recovery efficiency), etc.

The system 340 then receives a request to cache data that is persistently stored in one or more of the storage devices 380, such as by receiving the data after it is retrieved from the storage device(s) 380, or instead by retrieving the data from the storage device(s) 380 if so instructed. After obtaining the data to be cached, the system 340 uses the pool information 324 to identify the pool computing devices that are available to use and the configuration information 326 to determine how the storing of the cached data is to be performed, although in other embodiments may instead receive some or all such information as part of the request to cache the data. The system 340 then separates the retrieved data into multiple encoded data chunks, and stores at least one of the multiple data chunks in the volatile memory of each of at least some of the pool computing devices 360, as described in greater detail elsewhere. The system 340 may further update status information 322 on storage 320 to reflect the cached data that is currently stored in the distributed buffer cache.

When a request is later received for data, the system 340 uses the status information 322 to determine whether the requested data is available in the distributed buffer cache, and if so, determines a quantity of the pool computing devices 360 that are needed to recover the cached data (e.g., based on the status information 322 or configuration information 326). If the data is cached in the distributed buffer cache, the system 340 then interacts with at least the quantity of the pool computing devices 360 to retrieve at least that quantity of data chunks corresponding to the requested data and reconstructs the requested data from the retrieved data chunks, in accordance with the redundancy scheme originally used to store the cached data. The status information 322 may further be updated to reflect the retrieval of the cached data, such as if the cache maintenance policy is based at least in part on recency and/of frequency of use of cached data.

In addition, as previously noted, the system 340 may further perform operations in at least some embodiments to assist in replacing a pool computing device 360 that has become unavailable with a new pool computing device and/or in preloading the volatile memory of an existing pool computing device that has restarted. As discussed in greater detail elsewhere, such operations may include retrieving some or all of the cached data from remaining pool computing devices 360, reconstructing the various cached data from the retrieved data chunks, determining the one or more data chunks that were previously stored on the pool computing device that became unavailable or restarted, and preloading the volatile memory of the new pool computing device or the restarted pool computing device with the determined previously stored data chunks. The system 340 may further perform additional operations related to replacing unavailable pool computing devices in some embodiments, such as by updating pool information 324 to reflect existing pool computing devices that become unavailable and to reflect new computing devices that are added to the pool, by monitoring or otherwise tracking the availability of existing pool computing devices, and/or by initiating the providing and provisioning of replacement pool computing devices (e.g., by maintaining one or more backup pool computing devices, such as that are hot swappable), as discussed in greater detail elsewhere. The system 340 may additionally perform other activities at times in at least some embodiments, such as perform one or more of the following: to maintain the distributed buffer cache (e.g., to free cache memory) in accordance with the cache replacement strategy and other configuration information 236; to dynamically determine whether and when to expand or shrink the size of the distributed buffer cache (e.g., by adding or removing pool computing devices, respectively), such as to reflect usage patterns of the distributed buffer cache and/or in response to a request from a software program being supported; etc.

It will be appreciated that computing systems 300, 350, 360, and 380 are merely illustrative and are not intended to limit the scope of embodiments of the present disclosure. The distributed buffer cache manager system 340 may instead be executed by multiple interacting computing systems or devices, and computing system(s) 300 may be connected to other devices that are not illustrated, including through one or more networks such as the Internet, via the World Wide Web ("Web"), or other electronic communications network (e.g., cellular based network, public switched telephone network). More generally, a "client" or "server" computing system and a computing or storage device may comprise any combination of hardware and/or firmware that may interact in the described manners, optionally when programmed or otherwise configured with particular software, including (without limitation) desktop or other computers (e.g., laptops, tablets, smart phones, etc.), cell phones, network devices, PDAs, wireless phones, pagers, electronic organizers, Internet appliances, network-attached storage, devices in a storage area network, television-based systems (e.g., using set-top boxes and/or personal/digital video recorders), game consoles, media players and various other consumer products that include appropriate inter-communication capabilities. In addition, the functionality provided by the distributed buffer cache manager system 340 may in some embodiments be integrated as part of one or more other programs and systems, as described in greater detail elsewhere.

It will also be appreciated that, while various items are discussed or illustrated as being stored in volatile memory or on non-volatile storage while being used, these items or portions of them can be transferred between memory and other storage devices for purposes of memory management and data integrity. Alternatively, in other embodiments some or all of the software systems and/or modules may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., the distributed buffer cache manager system) and/or data structures, such as by execution of software instructions of the one or more software programs and/or by storage of such software instructions and/or data structures.

Furthermore, in some embodiments, some or all of the described techniques of the indicated systems and/or modules may be implemented or provided in other manners, such as at least partially using firmware and/or hardware means, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the systems, modules and/or data structures may also be stored (e.g., as software instructions or structured data) on one or more non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, modules and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 4:
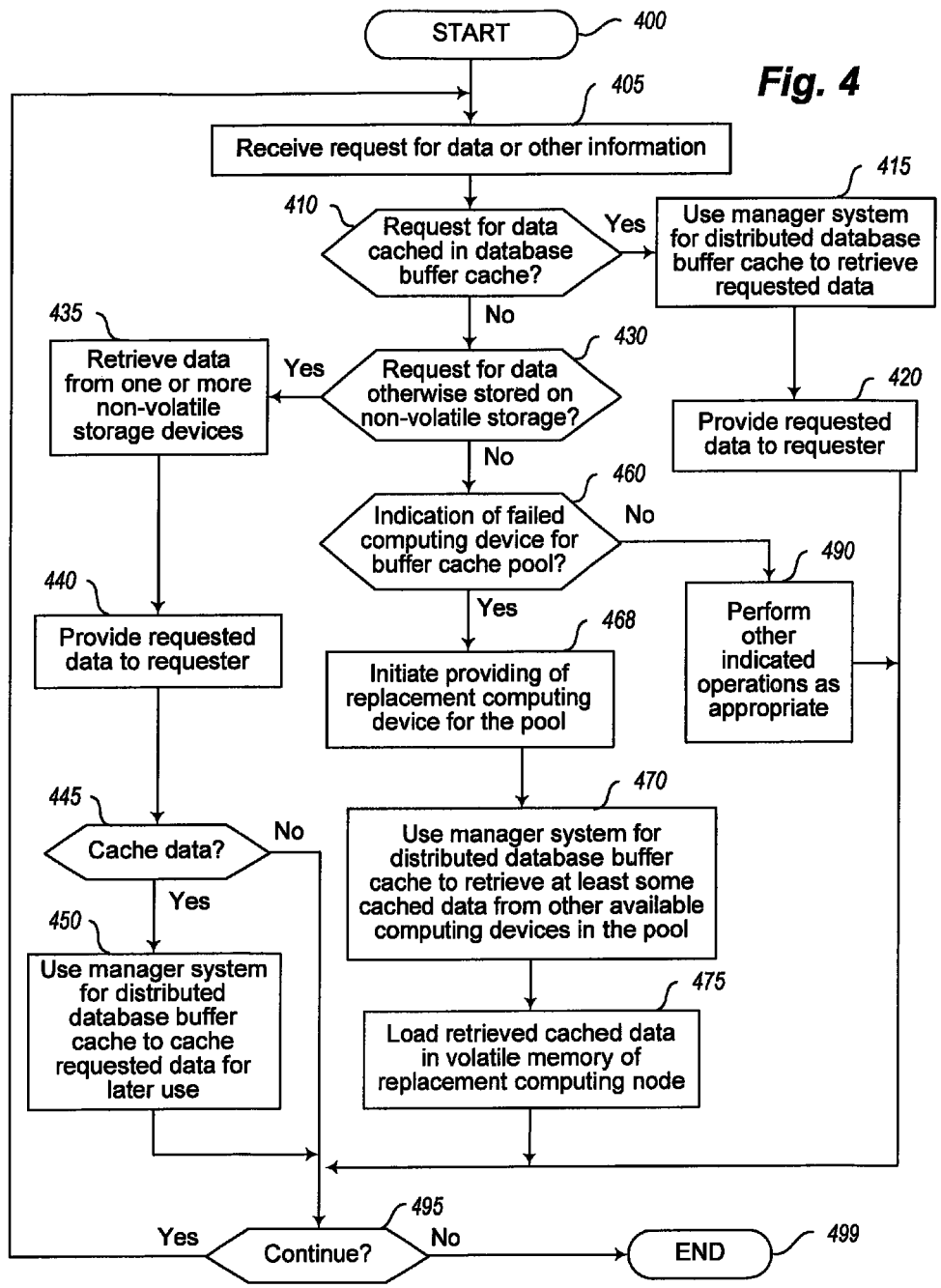
FIG. 4 is a flow diagram of an example embodiment of a routine that uses functionality of a distributed buffer cache.

FIG. 4 is a flow diagram of an example embodiment of a routine 400 for managing requests for data, based at least in part on use of a distributed database buffer cache. The routine may be provided by, for example, execution of the Web server system 110 and/or the database server program 135 of FIG. 1, and/or by execution of the Web server program 336 and/or the database server program 338 of FIG. 3, such as to receive and respond to requests for data as appropriate. While the illustrated embodiment of the routine uses a distributed buffer cache to support a database that has data stored on one or more non-volatile storage devices, other embodiments of the routine may use the distributed buffer cache in a similar manner in other environments, including environments without a database and/or a Web server program.

The illustrated embodiment of the routine begins at block 405, where a request corresponding to data is received. The routine continues to block 410 to determine whether the request received in block 405 is a request for database data that has already been cached in the distributed database buffer cache. For example, the routine may access information similar to that of information 322 of FIG. 3 to determine whether the data is cached, or instead may send a request for the distributed buffer cache manager system that provides the distributed buffer cache to indicate whether the data is cached. In particular, in the illustrated embodiment, if the data is cached, the routine continues to block 415 to use the manager system for the distributed buffer cache to retrieve the requested data, with one example of operations of such a manager system being further described with respect to FIGS. 5A and 5B. As discussed elsewhere, in some embodiments, a single request may be made to the distributed buffer cache manager system to provide data if it is cached, with the response including the data if it is cached, and otherwise not returning any such data. After receiving the requested data in block 415 from the manager system, the routine continues to block 420 to provide the requested data to the requester that supplied the request received in block 405.

If it is instead determined in block 410 that the request received in block 405 is not a request for database data that is already cached in the distributed buffer cache, the routine continues instead to block 430 to determine whether the request received in block 405 is for database data that is otherwise available, such as from one or more non-volatile storage devices that contain the database data. If so, the routine continues to block 435 to retrieve the requested data from one or more non-volatile storage devices and in block 440 provides the data to the requester. It will be appreciated that retrieving data from non-volatile storage may be performed in various manners in various embodiments, such as by invoking a corresponding operating system call if the non-volatile storage is local to the program performing the requesting. In block 445, the routine then determines whether to cache the retrieved data in the distributed buffer cache, such as based on a cache policy and current conditions (e.g., available free room in the cache), while in other embodiments all such retrieved data may be cached. In the illustrated embodiment, if it is determined in block 445 to cache the data, the routine continues to block 450 to use the manager system for the distributed buffer cache to add the requested data to the buffer cache for later use, such as by sending the retrieved data to the manager system. In other embodiments, all such retrieved data may be sent to the manager system, and the manager system may determine whether and how to cache particular data.

If it is instead determined in block 430 that the request received in block 405 is not for data available in the database, the routine continues instead to block 460 to determine whether an indication has been received that one of the computing devices in the pool used to support the distributed buffer cache has failed or otherwise become unavailable. As discussed in greater detail elsewhere, such determinations may be performed in various manners, such as by monitoring the computing devices of the pool (e.g., by performing periodic ping actions to contact the pool computing devices and monitor for a response), while in other embodiments the information may be received from another source (e.g., from the manager system; from one or more of the other computing devices in the pool for the distributed buffer cache, such as based on an inability to contact the unavailable pool computing device; etc.). If it is determined in block 460 that a pool computing device has failed, the routine continues to block 468 to initiate the providing of a replacement computing device for the pool. As discussed in greater detail elsewhere, such providing of a replacement computing device may be performed in various manners, including to use a standby computing device that is available for such replacement purposes, or instead to initiate the provisioning of a new computing device, and further in some embodiment may include adding the replacement computing device to the pool as soon as it is available. The routine then continues to block 470 to use the manager system for the distributed database buffer cache to retrieve at least some of the cached data in the distributed buffer cache from other available pool computing devices, and in block 475 loads at least some of the retrieved cached data in volatile memory of the replacement computing device. It will be appreciated that blocks 470 and 475 may in some embodiments be performed concurrent with the provisioning or other preparation of the replacement computing device, such that the replacement computing device may not be made available for the pool until after the operations in block 475 are completed. In at least some embodiments, the data loaded into the volatile memory of the replacement computing device is identical to or substantially similar to the cached data that was present in the volatile memory of the failed computing device before the failure occurred. In addition, as discussed in greater detail elsewhere, the identifying and loading of particular data for the distributed buffer cache in the replacement computing device may in at least some embodiments be performed using erasure coding techniques, so that the loaded contents of the replacement computing device includes one or more encoded data chunks available to assist in recovery of particular cached data using a subset of the pool computing devices.

If it is instead determined in block 460 that an indication is not received of a failed pool computing device, the routine continues instead to block 490 to perform one or more other indicated operations as appropriate. For example, as previously noted, the routine may in some embodiments perform periodic or occasional monitoring of pool computing devices in order to determine availability, may perform monitoring of non-volatile storage devices used to store data for the database, may perform other database-related activities (e.g., to write modified or new data to the non-volatile storage devices), etc. In some embodiments, additional cache-related operations may further be performed by the routine 400, such as to maintain the distributed buffer cache in accordance with any cache policies, while in other embodiments the manager routine for the distributed buffer cache instead performs such activities.

After blocks 420, 450, 475, or 490, or if it is instead determined in block 445 to cache the retrieved data, the routine continues to block 495 to determine whether to continue, such as until an explicit indication to terminate is received. If it is determined to continue, the routine returns to block 405, and otherwise continues to block 499 and ends.

Figure 5B:
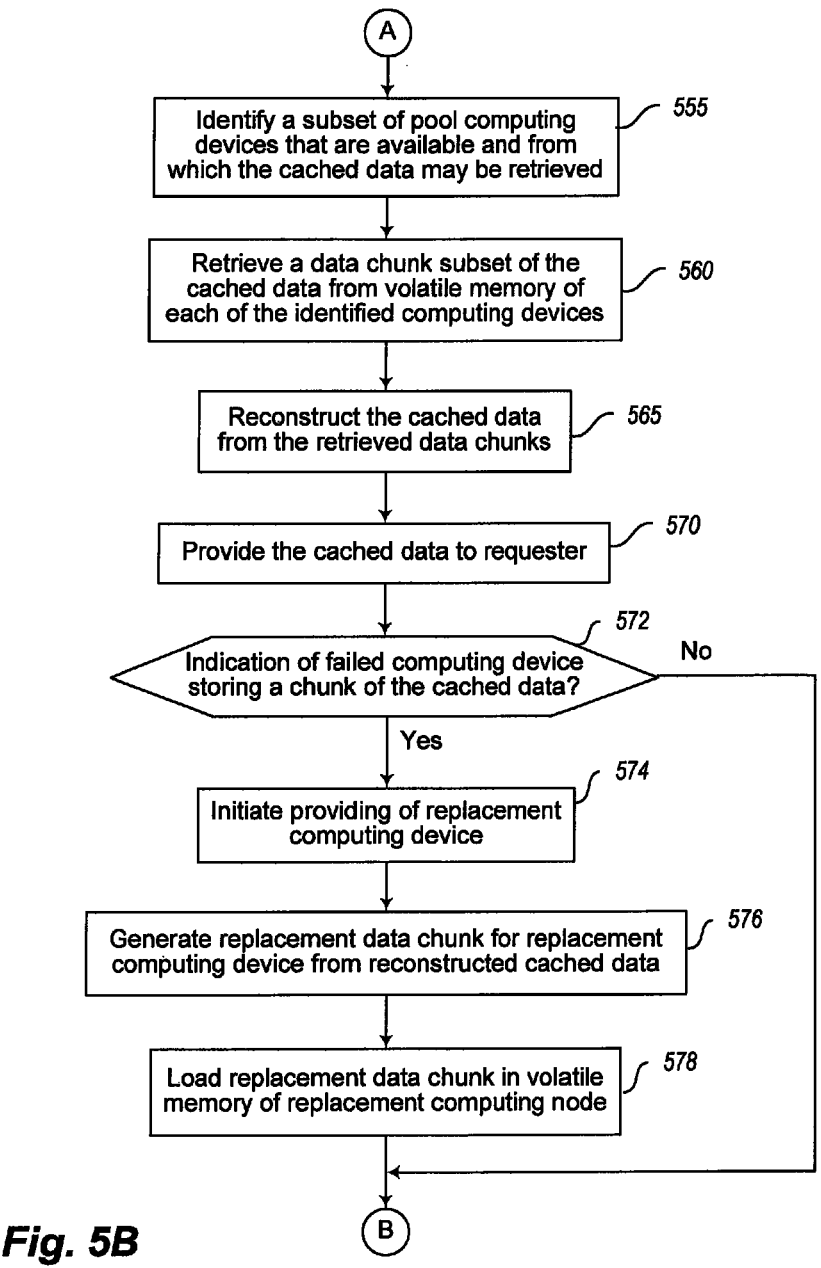

FIGS. 5A and 5B are a flow diagram of an example embodiment of a Distributed Buffer Cache Manager routine 500. The routine may be provided by, for example, execution of the distributed buffer cache manager system 340 of FIG. 3, and/or the distributed buffer cache manager system 150 of FIG. 1 (optionally while integrated with or otherwise associated with a database server program, Web server program, operating system program, or other application program type), such as to maintain a distributed buffer cache across a pool of multiple computing devices by using volatile memory of those pool computing devices. In the illustrated embodiment, the distributed buffer cache is used to support a database, as discussed in greater detail with respect to the routine of FIG. 4, although in other embodiments may be used to support other types of systems and environments (e.g., a Web server program cache). In addition, in the illustrated embodiment the routine 500 uses erasure coding techniques to distribute cache data across multiple computing devices of the pool in a redundant manner, although in other embodiments other types of data replication and redundancy techniques may be used, whether in addition to or instead of erasure coding techniques. The routine 500 may be invoked by the routine 400 of FIG. 4 at one or more times, such as with respect to one or more of blocks 410, 415, 445, 450 and 470.

The routine 500 begins in block 502, where a pool having a plurality of computing devices is identified for use in supporting a distributed buffer cache to be provided, based on use of volatile memory of the computing devices in the pool. The routine then continues to block 505 where it waits until it receives data or a request. After data or a request is received, the routine next continues to block 510 to determine whether a request is received in block 505 to cache data, and if so continues to block 515 to obtain the requested data, such as if the data was supplied with the request in block 505 or is otherwise available (e.g., by interacting with one or more non-volatile storage devices to retrieve the data). The routine then continues to block 520 to determine a quantity Y (or "first quantity") of multiple pool computing devices on which to cache the requested data (optionally a quantity of all of the pool computing devices), and in block 525 determines a quantity Z (or "second quantity") of the computing devices from which the requested data will be recoverable, with Z in the illustrated embodiment being greater than 1 and less than Y. In block 530, the routine then proceeds to use erasure coding techniques to separate the requested data into Y encoded data chunks that are recoverable from a subset Z of those data chunks, and in block 535 stores each of the Y data chunks in the volatile memory of one of the Y computing devices. In some embodiments, the quantity Y is fixed for all cache operations, such as to match a fixed quantity of all of the pool computing devices (or a fixed quantity that is a subset of the pool computing devices), while in other embodiments, the quantity Y may vary at different times and in different situations (e.g., based on the request, based on the number of currently available computing devices in the pool, by being selected to reflect one or more determined performance characteristics of interest, etc.). In a similar manner, in some embodiments, the quantity Z may be fixed for all cache operations, while in other embodiments may vary at different times and in different situations (e.g., based on the request, based on the number of available computing devices in the pool, based on the determined quantity Y for the request, by being selected to reflect one or more determined performance characteristics of interest (optionally in conjunction with a selected quantity Y), etc.).

If it is instead determined in block 510 that a request to cache data is not received in block 505, the routine continues instead to block 550 to determine whether a request is received to retrieve cached data, such as based on a received identification of the cached data of interest. If so, the routine continues to block 555 to identify a subset of the pool computing devices that are available and from which the cached data may be retrieved, such as a quantity Z of the pool computing devices that is a subset of a larger quantity Y pool computing devices across which the cached data was distributed. In block 560, the routine then retrieves an encoded data chunk of the cached data from the volatile memory of each of the identified computing devices, and in block 565 reconstructs the cached data from the retrieved data chunks. In block 570, the reconstructed cached data is then provided to the requester from whom the request was received in block 505. It will be appreciated that the retrieval and reconstruction of the cached data from the subset of the pool computing devices may be performed in various manners in various embodiments.

After block 570, the routine continues to block 572 to determine whether any of the pool computing devices that initially stored one or more encoded data chunks for the cached data requested in block 505 have become unavailable and not yet had its functionality replaced within the pool. If so, the routine continues to block 574 to initiate providing of a replacement computing device, such as in a manner similar to that previously described with respect to block 468 of FIG. 4. In addition, in some embodiments and situations, the providing of a replacement computing device for the requested cached data may include selecting another computing device that is already in the pool but that was not initially used to store any encoded data chunks for the requested cached data, to include that selected computing device among a subset of multiple pool computing devices that store encoded data chunks for the requested cached data. Alternatively, in some embodiments and situations, accommodating such a failed or otherwise unavailable computing device for the requested cached data may include redistributing the requested cached data across a different quantity of pool computing devices, such as among a smaller quantity of remaining available pool computing devices. After block 574, the routine continues to block 576 to use the reconstructed cached data from block 565 to generate a replacement data chunk for the replacement computing device, and in block 578 loads the replacement data chunk in volatile memory of the replacement computing node, in a manner similar to that previously discussed with respect to block 475 of FIG. 4. In some embodiments, the generation of the replacement data chunk may include encoding the requested cached data into a quantity of new encoded data chunks (whether the same quantity as was previously used or a different quantity), and reloading each new encoded data chunk on one of the pool computing devices that together store the requested cached data.

If it is instead determined in block 550 that the received request is not to retrieve cached data, the routine continues to block 590 to perform one or more other indicated operations as appropriate. For example, in at least some embodiments, the other indicated operations may include performing periodic or occasional cache maintenance operations (e.g., to clean data from the cache in accordance with cache policies, such as for the least recently used cache data), to perform periodic or occasional monitoring of some of or all of the computing devices in the pool to determine that they continue to be available (e.g., by performing ping operations or by monitoring pool computing devices that fail to respond to data requests), etc.

After blocks 535, 578 or 590, or if it was determined in block 572 that none of the pool computing devices have failed or otherwise become unavailable, the routine continues to block 595 to determine whether to continue, such as until an explicit indication to terminate is received. If it is determined to continue, the routine returns to block 505, and otherwise continues to block 599 and ends.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, it will be appreciated that in other embodiments the operations may be performed in other orders and in other manners. It will also be appreciated that the data structures discussed above may be structured in different manners, including with respect to database data structures and Web page data structures, such as by having a single data structure split into multiple data structures or by having multiple data structures consolidated into a single data structure. Similarly, in some embodiments, illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the disclosure. In addition, while certain aspects are presented below in certain claim forms, the inventors contemplate the various aspects in any available claim form. For example, while only some aspects of the disclosure may currently be recited as being embodied in a computer-readable medium, other aspects may likewise be so embodied.

What is claimed is:

1. A computer-implemented method comprising:
    receiving, by one or more configured computing systems, a request for data that is stored on one or more non-volatile storage devices;
    retrieving, by the one or more configured computing systems, the requested data from the one or more non-volatile storage devices; and
    caching, by the one or more configured computing systems, the requested data in a buffer cache that is distributed across volatile memory of multiple computing devices, the caching including:
        generating, using erasure coding, multiple encoded data chunks to store on the multiple computing devices, wherein each chunk of data is based on the requested data but does not include all of the requested data; and
        storing, for each of the multiple computing devices, at least one of the multiple encoded data chunks in the volatile memory of the computing device, wherein all of the requested data is recoverable from the stored encoded data chunks of less than all of the multiple computing devices.

2. The method of claim 1 further comprising, before the generating of the multiple encoded data chunks:
    selecting a first quantity of computing devices on which to store the multiple encoded data chunks for the requested data, and selecting a second quantity of computing devices from which the requested data may be retrieved using at least some of the stored encoded data chunks, the second quantity being less than the first quantity, and the selecting of the first and second quantities being based at least in part on one or more determined performance criteria of interest.

3. The method of claim 2 wherein the one or more determined performance criteria of interest include maximizing reliability in retrieval of the requested data from at least some of the multiple computing devices.

4. The method of claim 2 wherein the one or more determined performance criteria of interest include minimizing an amount of memory used for the storing of the multiple encoded data chunks on the multiple computing devices.

5. The method of claim 2 wherein a pool having a plurality of computing devices is available for use in the caching of the requested data, and wherein the method further comprises selecting the multiple computing devices from the plurality of computing devices of the pool, the multiple computing devices being of the selected first quantity and being a subset of the plurality of computing devices.

6. The method of claim 1 further comprising, after the caching of the requested data:
receiving a second request for the requested data from a remote client over one or more networks;
obtaining the requested data from the buffer cache by retrieving the stored encoded data chunks from each of two or more computing devices that are a subset of the multiple computing devices and by reconstructing the requested data from the retrieved stored encoded data chunks; and
providing the obtained data to the remote client over the one or more networks in response to the second request.

7. The method of claim 6 wherein the cached data is distributed across the volatile memory of the multiple computing devices to enable the requested data to be recoverable from any subgroup of the multiple computing devices that includes a specified quantity of computing devices, the specified quantity being less than a quantity of the multiple computing devices, and wherein the subset of the multiple computing devices from which the stored encoded data chunks are retrieved includes the specified quantity of computing devices.

8. The method of claim 1 wherein the generating of the multiple encoded data chunks includes selecting a first quantity of computing devices that is less than a quantity of the multiple computing devices, and generating at least one encoded data chuck to be stored on each of a subset of the multiple computing devices of the first quantity.

9. The method of claim 8 wherein the generating of the multiple encoded data chunks is further performed to enable recovery of the requested data from a second quantity of the multiple encoded data chunks that is greater than one and less than the first quantity.

10. The method of claim 1 wherein the multiple computing devices are part of a pool that provides the buffer cache, and wherein the method further comprises, after the caching of the requested data and after one of the multiple computing devices subsequently becomes unavailable, configuring a new computing device to replace the unavailable computing device in the pool, the configuring including:
recovering all of the requested data from a subset of the multiple computing devices that does not include the unavailable one computing device; and
storing at least some of the recovered data in volatile memory of the new computing device.

11. The method of claim 1 further comprising, after the caching of the requested data and after one of the multiple computing devices is restarted, preloading volatile memory of the restarted one computing device by:
recovering all of the requested data from a subset of the multiple computing devices that does not include the restarted one computing device; and
storing at least some of the recovered data in volatile memory of the restarted one computing device.

12. The method of claim 1 wherein the request for the data is associated with a remote client device and received by a Web server program from one or more networks, and wherein the method further comprises initiating sending of at least the requested data to the remote client device across the one or more networks.

13. The method of claim 1 wherein the one or more configured computing systems are part of a database server program that manages operation of a database that includes the data stored on the one or more non-volatile storage devices.

14. The method of claim 1 wherein the generating of the multiple encoded data chunks includes generating a quantity of encoded data chunks that matches a quantity of the multiple computing devices, such that each of the multiple computing devices stores a distinct one of the multiple encoded data chunks.

15. The method of claim 2 wherein the one or more determined performance criteria of interest include minimizing latency in at least one of storing of the multiple encoded data chunks and retrieval of the requested data from at least some of the multiple computing devices.

16. The method of claim 1 wherein an amount of the volatile memory of each of the multiple computing devices is less than a first amount, and wherein the method further comprises creating a pool of the multiple computing devices to enable the buffer cache that is distributed across the volatile memory of the multiple computing devices to store a second amount of cached data that is larger than the first amount.

17. The method of claim 1 further comprising, after the caching of the requested data:
modifying a copy of the requested data that is in memory external to the buffer cache;
initiating a write of the modified requested data to the one or more non-volatile storage devices without updating the cached requested data to include the modified requested data; and
updating the buffer cache to remove the cached requested data from the volatile memory of the multiple computing devices.

18. A non-transitory computer-readable medium whose stored contents configure a computing system to perform a method, the method comprising:
obtaining, by the configured computing system, data that is stored on non-volatile storage;
caching, by the configured computing system, the obtained data in a distributed redundant manner across volatile memory of multiple computing devices in a pool, the caching including:
generating, using erasure coding, multiple encoded data chunks to store on the multiple computing devices, wherein each chunk of data is based on the obtained data but does not include all of the obtained data; and
storing, for each of the multiple computing devices, at least one of the multiple encoded data chunks in the volatile memory of the computing device, wherein all of the obtained data is retrievable from the stored encoded data chunks of less than all of the multiple computing devices; and
after the caching of the obtained data, configuring a new computing device for use in the pool, the configuring including:
retrieving all of the obtained data from the stored encoded data chunks of less than all of the multiple computing devices; and
storing at least some of the retrieved data in volatile memory of the new computing device.

19. The non-transitory computer-readable medium of claim 18 wherein the configuring of the new computing device is performed in response to failure of one of the multiple computing devices of the pool and includes adding the new computing device to the pool, to enable the configured new computing device to replace the failed one computing device in the pool.

20. The non-transitory computer-readable medium of claim 18 wherein the configuring of the new computing device is performed in response to a determination to expand a size of a distributed buffer cache stored in the volatile memory of the multiple computing devices of the pool, and includes adding the new computing device to the pool to increase a quantity of the multiple computing devices of the pool.

21. The non-transitory computer-readable medium of claim 18 wherein the obtaining of the data from the non-volatile storage includes retrieving, in response to a request received from a remote client device over one or more networks, data from one or more non-volatile storage devices that store data for a database, wherein the volatile memory of the multiple computing devices is a distributed buffer cache of the database, and wherein the method further comprises sending the retrieved data to the remote client device.

22. The non-transitory computer-readable medium of claim 18 wherein the configured computing system is part of a Web server program, wherein the volatile memory of the multiple computing devices is used to provide a distributed buffer cache for the Web server program, and wherein the method further comprises providing one or more Web pages based at least in part on the obtained data.

23. The non-transitory computer-readable medium of claim 18 wherein the stored contents are instructions that when executed program the configured computer system to perform the method.

24. A system, comprising:
one or more processors of one or more computing systems; and
a manager system that, when executed by at least one of the one or more processors, configures the at least one processor to maintain a buffer cache that is distributed across volatile memory of a plurality of computing devices, the buffer cache for use with a database having data stored on one or more non-volatile storage devices, the maintaining of the buffer cache including:
obtaining a group of data stored together in the database from at least one of the one or more non-volatile storage devices; and
caching the obtained group of data in the buffer cache in a redundant manner by using multiple computing devices of the plurality of computing devices, the caching including:
generating, using erasure encoding, multiple encoded data chunks to store on the multiple computing devices, wherein each chunk of data is based on the obtained group of data but does not include all of the data of the obtained group; and
storing, for each of the multiple computing devices, at least one of the multiple encoded data chunks in the volatile memory of the computing device, wherein all of the data of the obtained group is recoverable from the stored encoded data chunks of less than all of the multiple computing devices.

25. The system of claim 24 wherein the generating of the multiple encoded data chunks using erasure coding is performed to enable a quantity of the stored encoded data chunks from which the data of the obtained group is recoverable to be selected to be greater than one and to be less than a larger quantity of the multiple computing devices.

26. The system of claim 24 wherein the plurality of computing devices are part of a pool that provides the buffer cache, wherein the multiple computing devices are a subset of the plurality of computing devices, and wherein the manager system is-includes software instructions that, when executed, further configured the at least one processor to, after the caching of the obtained group of data and after one of the multiple computing devices subsequently fails, configure a new computing device to replace the failed one computing device in the pool, the configuring including:
recovering all of the obtained group of data from the stored encoded data chunks of at least some of the multiple computing devices, the at least some computing nodes not including the one computing device that fails; and
storing at least some of the recovered obtained group of data in volatile memory of the new computing device.

27. The system of claim 24 wherein the manager system includes software instructions that, when executed, further configured the at least one processor to, after the caching of the obtained group of data in the buffer cache:
receive a request from a remote client device over one or more networks for the obtained group of data;
retrieve the obtained group of data from the buffer cache using two or more of the multiple computing devices; and
send the retrieved group of data to the remote client device over the one or more networks.

28. The system of claim 24 further comprising the one or more non-volatile storage devices and the one or more computing systems and the plurality of computing devices.

29. The system of claim 24 wherein the manager system consists of one or more means for performing the maintaining of the buffer cache of the database distributed across the volatile memory of the plurality of computing devices.

30. A computer-implemented method comprising:
receiving, by one or more configured computing systems, a request from a remote client device over one or more networks, the request being for data from a database that is stored on one or more non-volatile storage devices;
retrieving, by the one or more configured computing systems, the requested data from the one or more non-volatile storage devices;
providing, by the one or more configured computing systems, the requested data to the remote client device; and
storing, by the one or more configured computing systems, the requested data in a distributed buffer cache of the database that uses volatile memory of a plurality of computing devices of a pool, the distributed buffer cache enabling later use of the requested data without additional retrieving of the requested data from the one or more non-volatile storage devices, the storing of the requested data in the distributed buffer cache including:
determining using erasure coding, and for each computing device of the pool, a data subset of the requested data to be stored in volatile memory of the computing device, wherein all of the requested data is recoverable from less than all of the computing devices of the pool; and
storing, for each computing device of the pool, the determined data subset for the computing device in the volatile memory of the computing device.

31. The method of claim 30 further comprising, in response to one of the computing devices of the pool failing, configuring a new computing device to replace the failed computing device in the pool and adding the new computing device to the pool, the configuring including:
recovering all of the requested data from the stored determined data subsets of at least some of the computing devices that did not fail; and
storing at least some of the recovered data in volatile memory of the new computing device.

* * * * *

UNITED STATES PATENT AND TRADEMARK OFFICE
CERTIFICATE OF CORRECTION

PATENT NO.         : 9,942,084 B1
APPLICATION NO.    : 13/465962
DATED              : April 10, 2018
INVENTOR(S)        : James C. Sorenson, III It is certified that error appears in the above-identified patent and that said Letters Patent is hereby corrected as shown below:

Column 21, Line 60:
"manager system is-includes software instructions that, when" should read, --manager system includes software instructions that, when--.

Column 21, Line 61:
"executed, further configured the at least one processor to," should read, --executed, further configure the at least one processor to,--.

Signed and Sealed this
Nineteenth Day of June, 2018

Andrei Iancu
*Director of the United States Patent and Trademark Office*